United States Patent Office 3,592,911
Patented July 13, 1971

3,592,911
GASTROPODICIDAL 3,4-DICHLORO-AND 3,5-DI-CHLORO-THIOOXANILONITRILES
John F. Olin, Ballwin, and Walter A. Darlington, St. Louis, Mo., assignors to Monsanto Company, St. Louis, Mo.
No Drawing. Filed Oct. 23, 1968, Ser. No. 770,066
Int. Cl. A01n 9/12, 9/20, 9/30
U.S. Cl. 424—304
4 Claims

ABSTRACT OF THE DISCLOSURE

Compounds characterized by a thiooxanilonitrile nucleus wherein the phenyl substituent thereof is 3,4-dichloro or 3,5-dichloro substituted, which compounds are useful as gastropodicides.

---

This invention relates to substituted thiooxanilonitriles, which can also be termed substituted 1-thiocyanoformanilides, of the general formula

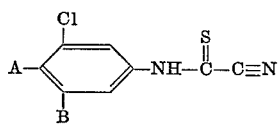

wherein A and B are unlike members of the group hydrogen and chlorine, which are useful as gastropodicides. These compounds are 3,4-dichlorothiooxanilonitrile and 3,5-dichlorothioxanilonitrile.

The compounds of this invention are particularly useful in destroying gastropods, that is the class of animal life Gastropoda within the phylum Mollusca, which cause considerable agricultural and horticultural damage, and particularly the snails of this class of animal life which are the necessary intermediate host or vector in the life cycle of various common parasites, as for example the trematodes or flukes which are parasitic in man and animals causing schistomiasis and like diseases.

As illustrative of the gastropodicidal properties of the compounds of this invention as compared to analogues and/or position isomers thereof, is the following:

Evaluation I

Ten (10) snails (*Planobarius corneus*, which is the species of snail host of the cyclocoelid *Tracheophilus sisowi*, the blood fluke *Bilharziella polonica* and several other trematodes) of 6 to 8 weeks of age are placed in a 250 ml. glass beaker and thereto is added the compound to be evaluated in the form of an aqueous dispersion thereof having a concentration of 1.0 part per million, that is p.p.m. (This dispersion is prepared by dissolving and/or dispersing sufficient of the particular compound in 10 ml. of acetone to make a one percent by weight solution or mixture thereof and then adding sufficient water to give dispersions of the following tabulated concentration.) The percent kill at the end of 24 hours at room temperature for each of the following itemized compounds at a 1.0 part per million concentration was found to be as follows:

| Compound [1] | Percent kill at 1.0 p.p.m. |
|---|---|
| 3,4-dichlorothiooxanilonitrile | 100 |
| 3,5-dichlorothiooxanilonitrile | 80 |
| 2,5-dichlorothiooxanilonitrile | 0 |
| 2,3-dichlorothiooxanilonitrile | 0 |
| 2,4,5-trichlorothiooxanilonitrile | 0 |
| 2-chlorothiooxanilonitrile | 0 |
| 4-chlorothiooxanilonitrile | 0 |

[1] All of these compounds and the preparation thereof are described in U.S. 3,287,102.

In combatting the aquatic Gastropoda it is necessary to apply the gastropodicide to the waters or land areas adjacent thereto which form their habitats, and therefore to be practical the compounds of this invention must exhibit gastropodicidal activity at relatively high dilutions, for example $10^{-5}$ to $10^{-8}$ by weight.

In combatting the amphibious Gastropoda the compounds of this invention can be employed per se or formulated into a dust and dispersed or scattered on the ground along banks of streams, rivers, irrigation canals, or the edges of other bodies of water, e.g., the seashore, so that the amphibious Gastropoda will come in contact with the gastropodicidal agent when it leaves the water and begins to travel across ground areas.

Where the Gastropoda, whether aquatic or amphibious, sought to be combated has a water habitat the compounds of this invention can be added per se to the water, or in the form of a formulated dust cast on the surface of the water, or sprayed on the water in the form of a solution thereof or a liquid emulsion formulation thereof.

Inert finely divided inert solid for the formulation of gastropodicidal dusts of this invention include fuller's earth, diatomaceous earth, bentonite, talc, pyrophillite, soybean flour, wood flour, and walnut shell flour, which dusts preferably have a particle size of 5 microns or below and contain from 5 to 95 percent by weight of a compound of this invention. Ordinarily such dusts will be applied at the rate of about 0.1 to 50 pounds of gastropodicidal agent per acre of surface area. These dusts based on the total weight thereof can also contain from 1 to 15 percent by weight of an anionic, or non-ionic surfactant or mixtures thereof to provide a "wettable" dust formulation. Liquid formulations can be prepared by dissolving the compounds of this invention in a suitable organic solvent such as acetone or butanone and sprayed as such or in admixture with a non-ionic or anionic surfactant or mixtures thereof to form a liquid emulsion formulation for spray purposes.

In all of the forms described above the formulations can be provided ready for use in combatting gastropods or they can be provided in a concentrated form suitable for mixing with or dispersing in other extending agents. As illustrative of a particularly useful concentrate is an initmate mixture of a compound of this invention with a water-soluble surfactant either non-ionic or anionic or mixtures thereof which lowers the surface tension of water in the weight proportions of 0.1 to 15 parts of surfactant with sufficient of a compound of this invention to make 100 parts by weight. Such a concentrate is particularly adapted to be made into a spray for destroying various forms of gastropods by the addition of water thereto. As illustrative of such a concentrate is an intimate mixture of 50 parts by weight of 3,4-dichlorothiooxanilonitrile and 5.0 parts by weight of a water-soluble non-ionic surfactant such as polyoxyethylene derivatives of sorbitan monolaurate.

Another useful concentrate adapted to be made into a spray for combatting gastropods is a solution (preferably as concentrated as possible) of a compound of this invention in an organic solvent therefor, for example acetone, cyclohexanone or acetophenone. The said liquid concentrate preferably contains dissolved therein a minor amount (e.g. 0.5 to 20 percent by weight of the weight of the new gastropodicidal agent) of a non-ionic or anionic surfactant or mixtures thereof, which surfactant is also water-soluble. As illustrative of such a concentrate is a solution of 3,4-dichlorothiooxanilonitrile in acetone which solution contains dissolved therein a water-soluble alkylarylsulfonate anionic surfactant, e.g. sodium dodecylbenzenesulfonate, or a water-soluble cationic surfactant of the $C_{12-22}$ fattyamine-ethyleneoxide condensate type.

Of the surfactants aforementioned in preparing the various emulsifiable, wettable or dispersible compositions or concentrates of this invention, the water-soluble anionic and non-ionic surfactants described in U.S. 2,846,398 are preferred. Of the anionic surfactants, the particularly preferred are the well-known water-soluble alkali metal alkylarylsulfonates as exemplified by sodium decylbenzenesulfonate and sodium dodecylbenzenesulfonate. Of the non-ionic surfactants the particularly preferred are the water-soluble polyoxyethylene derivatives of alkylphenols (particularly isooctylphenol) and the water-soluble polyoxyethylene derivatives of the mono-higher fatty acid esters of sorbitan containing 15 to 30 moles of ethylene oxide per mole of sorbitan mono-ester of a higher fatty acid, e.g. oleic acid.

In all of the various dispersions described hereinbefore for gastropodicidal purposes, the active ingredient can be one or more of the compounds of this invention. The compounds of this invention can also be advantageously employed in combination with other pesticides, including, for example, nematocides, bacterocides, and insecticides. In this manner it is possible to obtain mixtures which are effective against a wide variety of pests and other forms of noxious life.

The actual effective concentration of the compound of this invention for gastropodicidal purposes will depend upon the particular Gastropoda, weather conditions, and whether it is to be applied directly to the water which forms the habitat for the Gastropoda or to land areas which are crossed by amphibious Gastropoda either as the compound per se or in the form of formulations thereof. Those skilled in this art can readily determine the proper concentration for any particular application by knowing the particular dilution factor, which is generally expressed as the maximum aqueous dilution which will produce a 50% kill.

While this invention has been described with respect to certain embodiments it is to be understood that it is not so limited and that variations and modifications thereof obvious to those skilled in the art can be made without departing from the spirit or scope of this invention.

What is claimed is:

1. A method of destroying gastropods which comprises contacting the gastropods with a gastropodicidally toxic amount of a substituted thiooxanilonitrile of the formula

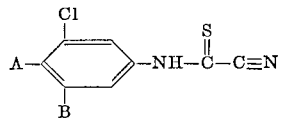

wherein A and B are unlike members of the group consisting of hydrogen and chlorine.

2. A method of claim 1 wherein A is chlorine and wherein B is hydrogen.

3. A method of claim 1 wherein A is hydrogen and wherein B is chlorine.

4. A method of destroying gastropods which comprises contacting the gastropods in their water habitat with a gastropodicidally toxic amount of 3,4 - dichlorothiooxanilonitrile.

References Cited

UNITED STATES PATENTS 3,238,092   3/1966   Boyce et al. _____ 424—304X
3,287,102   11/1966  Olin _____ 71—98

ALBERT T. MEYERS, Primary Examiner

L. SCHENKMAN, Assistant Examiner